Patented Apr. 4, 1944

2,345,955

UNITED STATES PATENT OFFICE 2,345,955

NONGELLING BRONZING LACQUER

Herbert L. Wampner, Terre Haute, Ind., assignor to Commercial Solvents Corporation, Terre Haute, Ind., a corporation of Maryland No Drawing. Application November 12, 1942, Serial No. 465,385

7 Claims. (Cl. 106—193)

My invention relates to improvements in cellulose ester bronzing lacquers. More particularly, it relates to a method for preventing gelling or livering of nitrocellulose lacquers containing bronze powders.

Bronzing lacquers are essentially composed of a suspension of bronze powder in a nitrocellulose solution, or what is commonly known in the lacquer art, as a bronzing liquid. The usual solvent mixtures are employed in such bronzing liquids and nitrocellulose of varying viscosities may be used, while ingredients, such as plasticizers and gums, are frequently added to improve the adhesion of the film to the under surface, and to improve its flexibility. In general, the bronze powder is added after the other ingredients of the lacquer have been thoroughly mixed and just prior to the use thereof. Since such lacquers are notoriously unstable in the presence of bronze powder, the period during which the resulting bronze lacquer remains fluid, and in a condition such that it may be applied by brush or spray-gun will be found to be limited, and for the most part depends upon the concentration and type of bronze powder used, the grade of cotton, the strength of the solvent mixtures, and various other factors. Ordinarily, however, gelling or agglomeration occurs very soon after the bronzing material has been introduced, i. e., within one day's time or less. The gels formed by such lacquers, although some times soluble in strong solvents, in the majority of cases cannot be dissolved by further addition of the common solvent mixtures or by any mechanical means. Therefore, the tendency of such gels to form obviously limits the utility of the aforesaid bronzing lacquers.

Realizing the above defects in such lacquers, prior workers have endeavored to inhibit the formation of gels therein by numerous means, such as for example, by the addition of relatively small amounts of malic acid or the alkali metal salts of malic acid, and while the use of free malic acid has met with varying degrees of success, this compound possesses certain undesirable qualities which render it impractical for numerous commercial applications. For example, because of the low degree of solubility of malic acid in the common organic solvents, it is difficult to prepare stock solutions of such bronzing lacquers to which malic acid has been added. Also the increased acidity in the lacquer, due to the presence of malic acid, rendered the use of such coating compositions highly impractical because of their deleterious effects upon metals. Furthermore, materials such as aluminum bronze, which finds wide application in the coating field, loses its leafing ability when present in such lacquers containing free malic acid. The use of alkali metal salts of malic acid are likewise objectionable because of their low solubility in the lacquer compositions commonly encountered, and although such compounds do possess the ability to inhibit the formation of gels in these lacquers, I have found that the use of said compounds is not at all practical because of the fact that inhibiting quantities thereof cannot be readily dissolved in the bronzing lacquer without disturbing the solvent balance therein.

I have now discovered that bronzing lacquers of the type mentioned above, as well as those containing oil-modified alkyd resins as the principal film-forming agent, may be rendered highly resistant to gelling or livering by adding thereto in small quantities a malic acid salt of certain aminohydroxy compounds. The amount of such salts, generally required to prevent livering or agglomeration of the coating materials, in general, will be found to depend upon the character and composition of the lacquer. In certain instances, the tendency of such compositions to gel has been considerably decreased by incorporating therein as little as 0.05 per cent, based upon the weight of the solid present, of the salt formed from malic acid and any one of the several aminohydroxy compounds of the type specifically mentioned below. Generally the use of from approximately 0.05 per cent to 1.0 per cent will be found sufficient to prevent gelling during practical working periods.

Also, as a direct result of my invention, it has now been made possible to prevent gelling of such bronzing lacquers over extended periods of time, i. e., for the ordinary shelf life of these coating materials. This result may be accomplished by replacing a portion of the plasticizer present, by a concentrate containing a malic salt of the above-mentioned type. These concentrates may constitute the crude reaction mixture resulting from the production of said malic salts as described below, and the composition and quantity of the concentrate required to render bronzing lacquers of the class described, substantially permanently free from any tendency to gel or liver, will be found to vary with composition of the lacquer. However, I have found that from about 25 per cent to 65 per cent of said concentrate, based upon the weight of the film-forming agent present, is generally adequate to inhibit the occurrence of livering when the lacquers are stored over extended periods of time.

An outstanding advantage of the bronzing lacquers, stabilized with the gel-inhibiting agents of my invention constitutes the fact that the aforesaid lacquers possess none of the previously-mentioned disadvantages exhibited by such compositions employing malic acid or the alkali metal salts thereof as anti-livering or anti-gelling agents. On the contrary, stock solutions of such lacquers may be readily prepared owing to the high degree of solubility of the stabilizing agents of my invention in the common organic solvents. Furthermore, coating materials, which contain such stabilizing agents, do not affect metal surfaces and, in addition, possess a high degree of color stability.

The coating compositions, in which my stabilizing agents may be utilized, may be any of the usual type of lacquers or varnish base enamels. The lacquers may be prepared from nitrocellulose of varying viscosities. For example, cellulose nitrate ranging in viscosities of from ¼ second to 20 seconds or slightly higher, are admirably suited for preparing the bronzing lacquers of my invention. The customary plasticizers, such as butyl phthalate, cresyl phosphate or castor oil may likewise be utilized. The solvents may be any of the usual esters, alcohols, ketones, ethers, etc.

The salts of malic acid, which I have found capable of satisfactorily inhibiting gel formation in bronzing lacquers of the above-described type, are exemplified by the following compounds: 1-(hydroxymethyl)isopropylammonium malate, 1-(hydroxymethyl)propylammonium malate, 1,1-bis(hydroxymethyl)ethylammonium malate, 1,1-bis(hydroxymethyl)propylammonium malate, 1,1-bis(hydroxymethyl)ethylammonium acid malate, and the like.

The malic acid salts employed in the preparation of the non-livering coating compositions of the present invention, may be produced in any convenient manner. For example, the desired aminohydroxy compound and the solvent mixture may be mixed together and thereafter, the malic acid added slowly thereto in the desired combining amounts with thorough agitation which is continued until solution is complete. This procedure is preferably carried out at a temperature of between 50°–60° C., since such conditions tend to increase the rate of solution. The solvent mixture, previously referred to, ordinarily should consist of a suitable plasticizer, such as butyl phthalate, a dihydric alcohol, such as 2-methyl-2,4-pentanediol, together with a third solvent, such as, for example, butyl "carbitol."

Other standard ingredients of such bronzing lacquers, may be incorporated therein in accordance with standard formulation methods, and any of the standard plasticizers, resins such as the oil-modified alkyds, and the like, may be generally employed.

The examples which follow are illustrative of the scope of the present invention:

Example I

A lacquer was prepared containing 50 parts by weight of ½ sec. nitrocellulose, 25 parts by weight of ester gum, 25 parts by weight of butyl phthalate and 330 parts by weight of a solvent mixture of the following composition:

| | Per cent by volume |
|---|---|
| Butyl acetate | 25 |
| Ethyl acetate | 15 |
| Ethyl alcohol | 5 |
| Toluene | 55 |

Pure copper bronze powder was then added to two samples of the clear lacquer prepared as described above, in a concentration of approximately 30 per cent by weight of the prepared lacquer, and to one of the samples was added, in the form of 1 per cent alcoholic solution .06 per cent by weight of 1-(hydroxymethyl)isopropylammonium malate, based upon the total amount of the solids present. Each sample of bronzing lacquer was thoroughly mixed and permitted to stand for 24 hours at the end of which time they were examined. The blank had set to a thick gel, whereas the viscosity of the sample to which the 1-(hydroxymethyl)isopropylammonium malate had been added remained substantially unchanged at the end of 144 hours. Samples of the same lacquer containing .18 and .30 per cent by weight of 1-(hydroxymethyl)isopropylammonium malate, retained a satisfactory viscosity suitable for application, either by means of spraying, or brushing, for a period of 20 days and 28 days, respectively.

Example II

A lacquer was prepared by dissolving 40 parts by weight of ½ second nitrocellulose, 40 parts by weight of a non-oxidizing medium oil-modified alkyd resin, 15 parts by weight of butyl phthalate in 330 parts by weight of a solvent mixture having the composition stated in Example I. Pure copper bronze powder was then added to two samples of the clear lacquer in a concentration of approximately 30 per cent by weight of the prepared lacquer, and to one of the samples was added .06 per cent by weight of 1,1-bis(hydroxymethyl)ethylammonium acid malate, in the form of a 1 per cent alcoholic solution. Each sample of bronzing lacquer was thoroughly mixed and permitted to stand for 24 hours, at the end of which time the blank had set to a thick gel, while the viscosity of the sample containing the 1,1-bis(hydroxymethyl)ethylammonium acid malate, remained substantially unchanged at the end of 72 hours. Samples of the same lacquer, to which .18 per cent and .30 per cent of the above stabilizer based upon the weight of the solids present, had been added, gelled at the end of 20 days and 29 days, respectively.

The above examples are merely illustrative and it is to be specifically understood that they do not limit my invention to the use of the materials or combinations specifically mentioned therein, since other stabilizing agents of the type enumerated above function equally well as inhibitors of gellation in bronzing lacquers of the class described. For instance, I have observed that clear lacquers, of the type described in the foregoing examples, will, on contact with lead or lead compounds, likewise tend to rapidly form gels. I have found, however, that gellation of these lacquers, under such conditions, may also be inhibited by the use of my new anti-livering agents. Accordingly, it is intended that the term "bronze powder" appearing in the appended claims be construed to cover lead or its compounds.

The various embodiments of the present invention illustrated by the foregoing examples are obviously subject to numerous modifications. Therefore, it is to be specifically understood that I do not desire to restrict myself to the particular bronzing lacquers, and to the methods for obtaining the same, which have been set forth in the examples, but it is intended that the present invention shall include by the terminology employed in the following claims all features of patentable novelty which are inherent therein.

Having now described my invention, what I claim is:

1. A coating composition free from basic pigments and having reduced tendencies to liver or agglomerate, which comprises a bronze powder, a film-forming agent selected from the group consisting of cellulose nitrate and an oil-modified alkyd resin and a salt of malic acid selected from the group consisting of 1-(hydroxymethyl)isopropylammonium malate, 1-(hydroxymethyl)propylammonium malate, 1,1 - bis(hydroxymethyl)ethylammonium malate, 1,1-bis(hydroxymethyl)propylammonium malate, and 1,1-bis-(hydroxymethyl)ethylammonium acid malate.

2. A coating composition free from basic pigments and having reduced tendencies to liver or agglomerate, which comprises a bronze powder, an oil-modified alkyd resin as the principal film-forming agent and a salt of malic acid selected from the group consisting of 1-(hydroxymethyl)isopropylammonium malate, 1-(hydroxymethyl)propylammonium malate, 1,1 - bis(hydroxymethyl)ethylammonium malate, 1,1 - bis-(hydroxymethyl)propylammonium malate, and 1,1 - bis(hydroxymethyl)ethylammonium acid malate.

3. A coating composition free from basic pigments and having reduced tendencies to liver or agglomerate, which comprises a bronze powder, cellulose nitrate as the principal film-forming agent and from between about 0.05 per cent to 1.0 per cent by weight of a malic acid salt selected from the group consisting of 1,1-bis(hydroxymethyl)ethylammonium malate, 1-(hydroxymethyl)propylammonium malate, 1-(hydroxymethyl)isopropylammonium malate, 1,1-bis(hydroxymethyl)propylammonium malate, and 1,1-bis(hydroxymethyl)ethylammonium acid malate.

4. A method for reducing the tendency to liver or agglomerate in coating compositions free from basic pigments but containing a bronze powder and cellulose nitrate, and a drying oil-modified alkyd resin as the principal film-forming agents, which comprises adding thereto 1,1-bis(hydroxymethyl)ethylammonium acid malate.

5. A method for reducing the tendency to liver or agglomerate in coating compositions free from basic pigments but containing a bronze powder and cellulose nitrate as the principal film-forming agent, which comprises adding thereto 1-(hydroxymethyl)isopropylammonium malate.

6. A coating composition free from basic pigments and having reduced tendencies to liver or agglomerate, which comprises a bronze powder, cellulose nitrate as the principal film-forming agent, and a salt of malic acid selected from the group consisting of 1-(hydroxymethyl)isopropylammonium malate, 1-(hydroxymethyl)propylammonium malate, 1,1-bis(hydroxymethyl)ethylammonium malate, 1,1-bis(hydroxymethyl)propylammonium malate, and 1,1-bis(hydroxymethyl)ethylammonium acid malate.

7. A coating composition free from basic pigments and having reduced tendencies to liver or agglomerate, which comprises a bronze powder, cellulose nitrate and an oil-modified alkyd resin as the principal film-forming agents, and a salt of malic acid selected from the group consisting of 1-(hydroxymethyl)isopropylammonium malate, 1-(hydroxymethyl)propylammonium malate, 1,1-bis(hydroxymethyl)ethylammonium malate, 1,1-bis(hydroxymethyl)propylammonium malate, and 1,1-bis(hydroxymethyl)ethylammonium acid malate.

HERBERT L. WAMPNER.